Dec. 4, 1934.  H. C. DRAKE  1,983,442
FISSURE DETECTOR FOR RAILS
Filed May 12, 1928  4 Sheets-Sheet 1
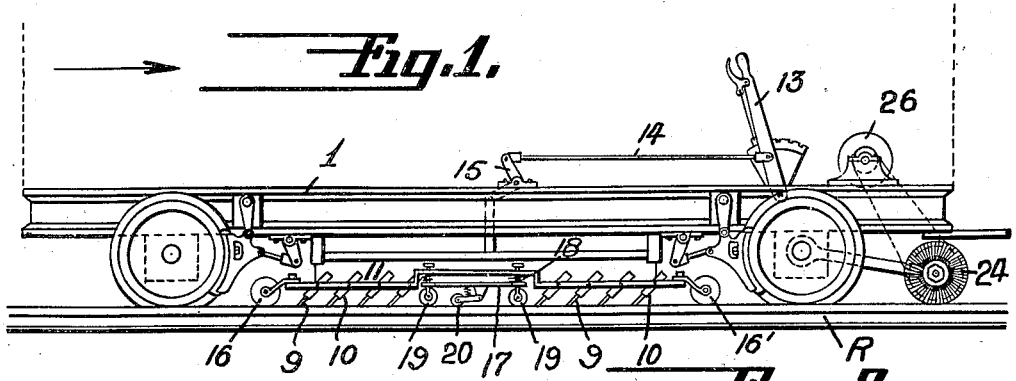
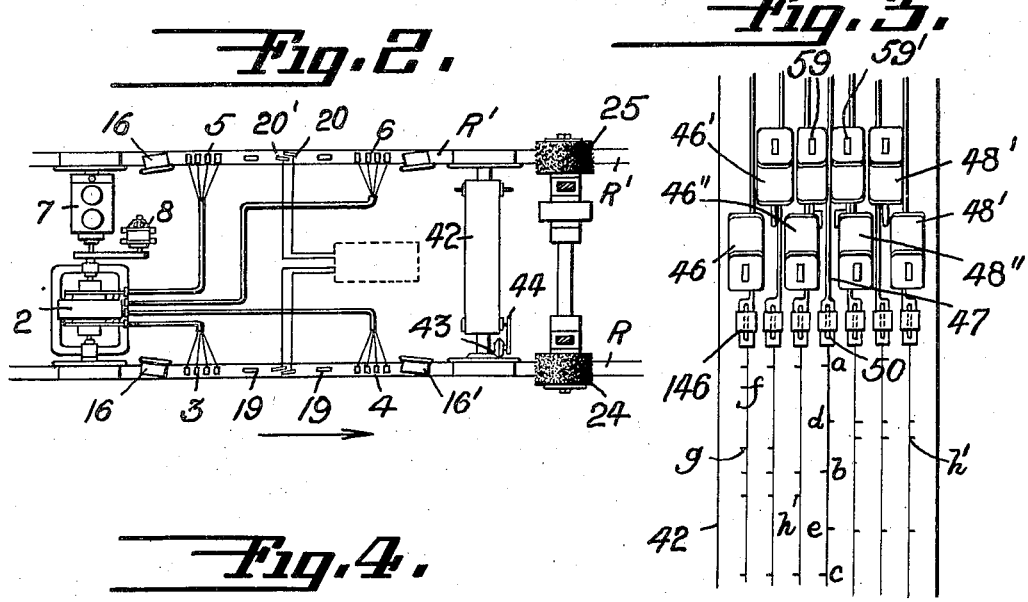
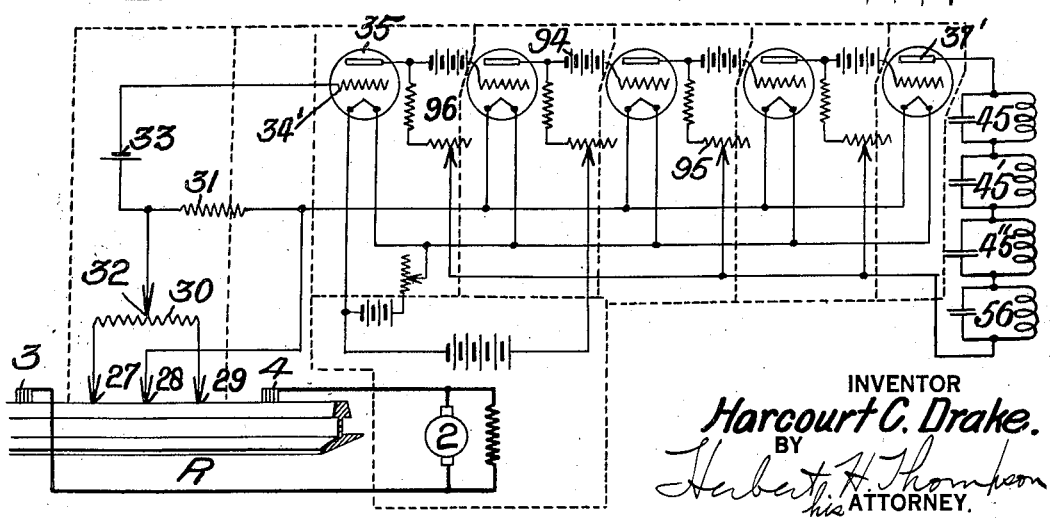
INVENTOR
Harcourt C. Drake.
BY
Herbert H. Thompson
his ATTORNEY.

Dec. 4, 1934.  H. C. DRAKE  1,983,442
FISSURE DETECTOR FOR RAILS
Filed May 12, 1928  4 Sheets-Sheet 2

INVENTOR
Harcourt C. Drake.
BY
Herbert H. Thompson
his ATTORNEY.

Dec. 4, 1934.   H. C. DRAKE   1,983,442
FISSURE DETECTOR FOR RAILS
Filed May 12, 1928   4 Sheets-Sheet 3
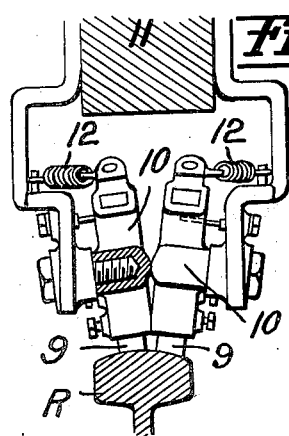
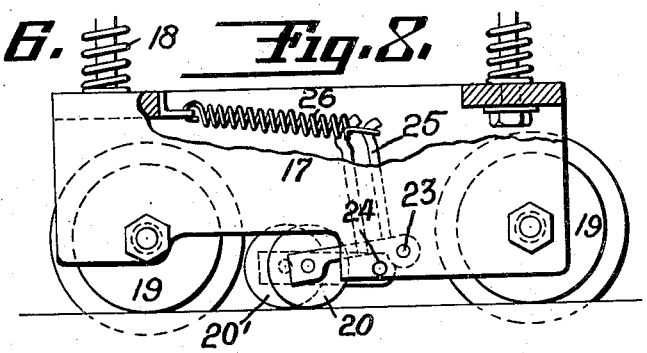
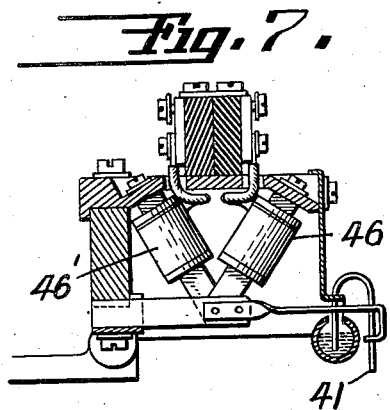
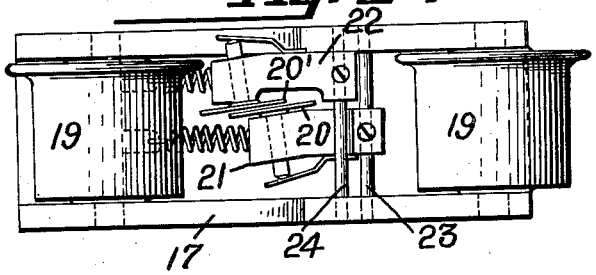
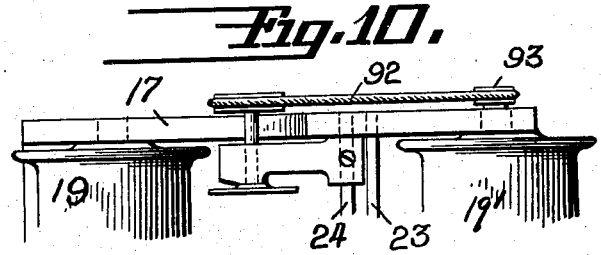
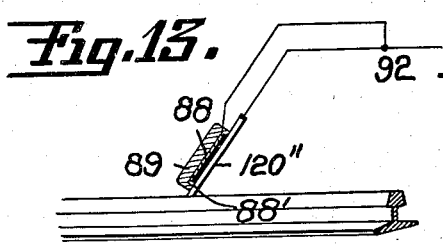
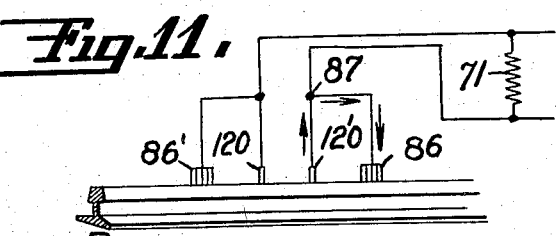
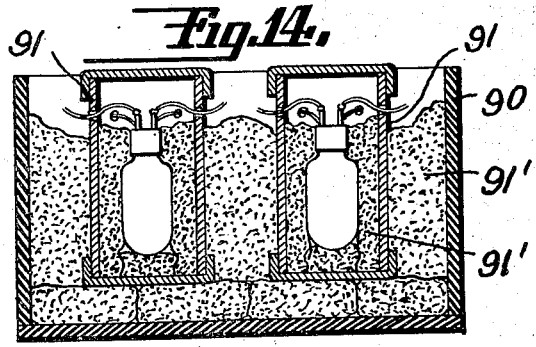
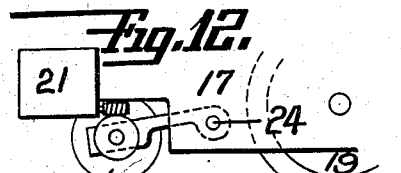
INVENTOR
Harcourt C. Drake.
BY Herbert H. Thompson
his ATTORNEY.

Dec. 4, 1934.  H. C. DRAKE  1,983,442
FISSURE DETECTOR FOR RAILS
Filed May 12, 1928  4 Sheets-Sheet 4
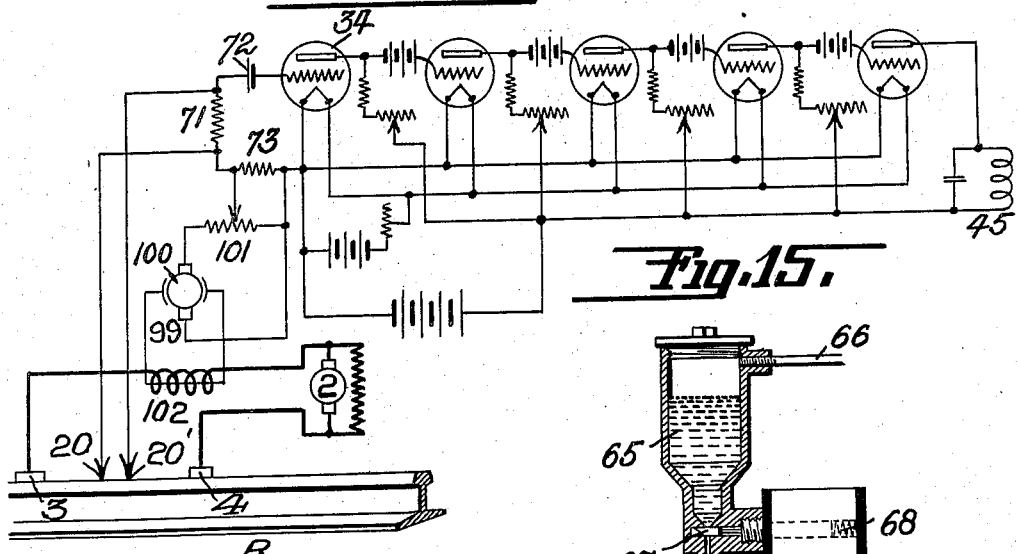
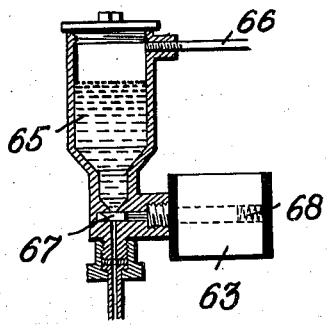
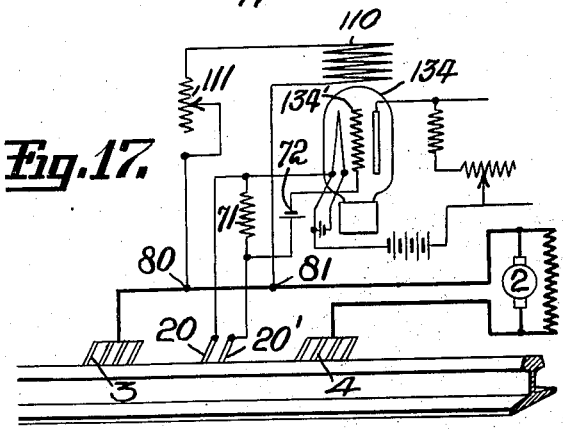
INVENTOR
*Harcourt C. Drake.*
BY
*Herbert H. Thompson*
his ATTORNEY.

Patented Dec. 4, 1934

1,983,442

UNITED STATES PATENT OFFICE 1,983,442

FISSURE DETECTOR FOR RAILS

Harcourt C. Drake, Hempstead, N. Y., assignor, by mesne assignments, to Sperry Products, Inc., Brooklyn, N. Y., a corporation of New York Application May 12, 1928, Serial No. 277,240

8 Claims. (Cl. 175—183)

This invention relates to automatic means for detecting flaws or hidden fissures in metal bars, rails and the like and has especial application to the detection of such flaws in railway rails either before or after they have been laid in the track. It is now thought that such flaws in very small form as shatter cracks are occasionally present in the rail as it comes from the rolling mill and that the passage of the trains and heavy locomotives gradually increases the size of the fissure or flaw until the rail actually breaks, which, of course, on mainline tracks results in a derailment and many times in a serious wreck.

The purpose of the present invention is to devise a testing apparatus for rails of such sensitivity and selectiveness that it will detect and indicate or record the fissure before it has reached a dangerous size and will not be affected by or indicate (at least in a manner to be confused with the flaw indications) variations in the voltage supply or current flowing through the rail or poor contact of either the main or detector brushes with the rail.

More especially this invention comprises an improvement in my prior Patent No. 1,870,796, granted Aug. 9, 1932, for Rail flaw detectors, with special reference to the means for preventing variations in the supply voltage or poor contact conditions from affecting the accuracy of the flaw detector. In my present application, I provide means to prevent the apparatus from being affected by such causes so that only the rail fissures are recorded on the chart. A further object of this invention is to improve the sensitivity of the apparatus and its reliability. For instance, tests of my apparatus under operating conditions produced indications likely to be confused with flaws, the cause of which it was most difficult to find. One source of trouble I have eliminated by shielding the radio tubes not only from short wave radio-frequency waves but also from magnetic lines of force. Another most elusive source of trouble was finally traced to the generation of a thermal couple at the point of contact of the detector brushes and the rail due to the heating of the brush at this point as compared to remote portions of the system. To overcome this difficulty is a further object accomplished by my invention. Other objects of my invention will become apparent as this description proceeds.

Referring to the drawings in which several preferred forms of the invention are shown:

Fig. 1 is a diagrammatic side elevation of the chassis of a test car constructed according to my invention.

Fig. 2 is a diagrammatic plan view of the same on a smaller scale.

Fig. 3 is a plan view of the recording chart and markers.

Fig. 4 is a diagram of one form of detecting and amplifying apparatus of my invention.

Fig. 6 shows a transverse sectional view on an enlarged scale of the main supply brushes and holders.

Fig. 7 is a sectional view on an enlarged scale of the recording pen mechanism.

Fig. 8 is a side elevation on an enlarged scale of the carriage for the detector brushes.

Fig. 9 is a bottom plan view of the same.

Fig. 10 is a view corresponding to Fig. 12 showing a modified form of detector brush or roller for eliminating thermocouples.

Fig. 11 is a diagrammatic view showing still another method of eliminating thermo-couples.

Fig. 12 is a diagrammatic view showing still another method of accomplishing the same result.

Fig. 13 is a diagrammatic view of still another method of eliminating thermo-couples.

Fig. 14 is a sectional detail showing how I prefer to mount the tubes of my set.

Fig. 15 is a sectional detail of the rail marking device.

Figs. 16 and 17 are wiring diagrams of modified forms of the invention.

Figure 5:
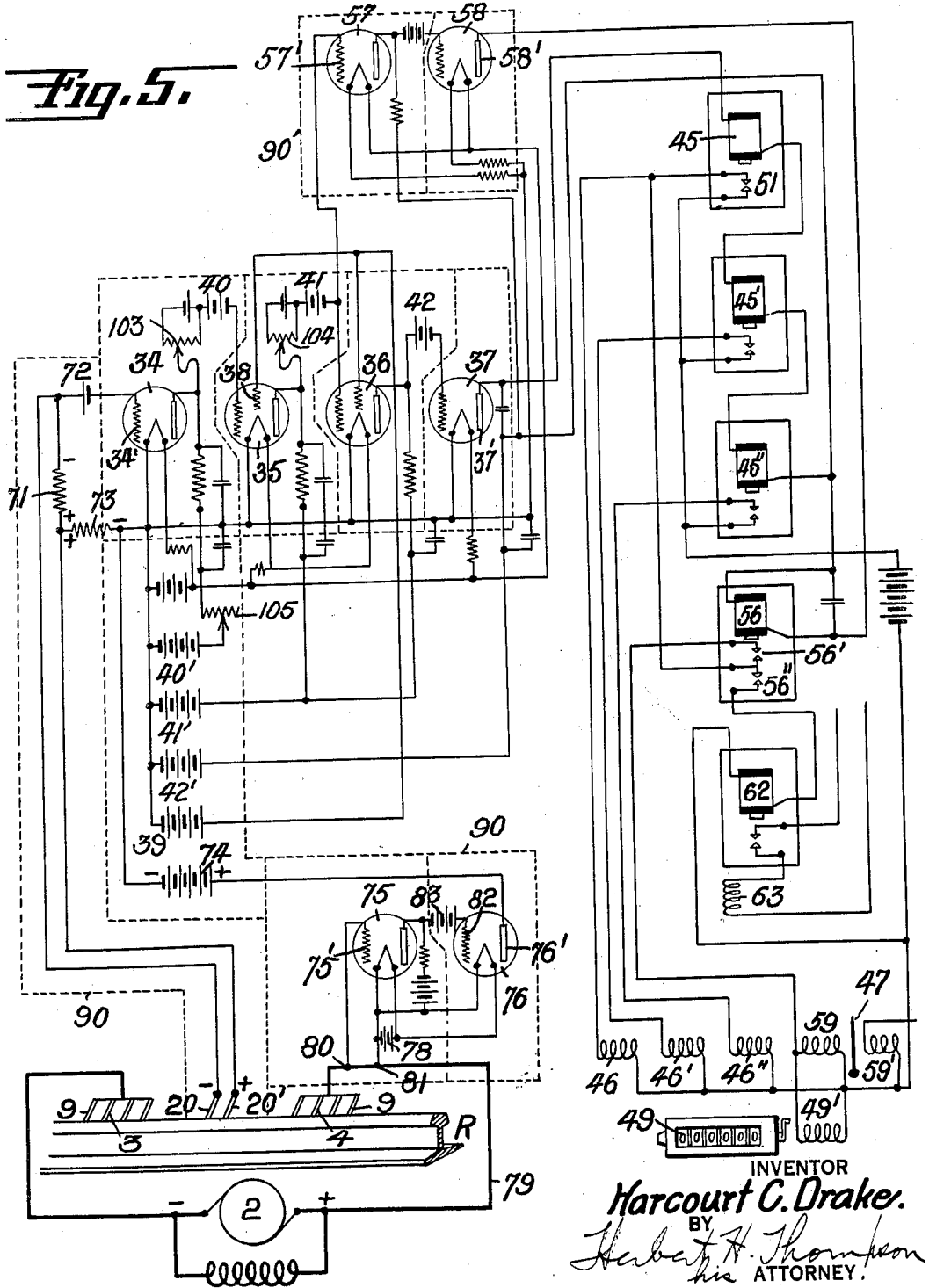
Fig. 5 is a similar diagram of my preferred form of the invention.

For detecting flaws in laid track, I prefer to utilize a car 1 which itself contains means for supplying the heavy current to the rails. For this purpose a low voltage, high amperage generator 2 is mounted on the car, which is preferably provided with double armature windings, one winding leading to the brushes 3—4 upon one rail R and the other winding leading to the brushes 5—6 on the other rail R'. The generator may be driven by any suitable source of power, such as combustion engine 7 and may be provided with an exciter 8. Each group of brushes is shown in Fig. 1 as comprising four separate units each comprising a brush 9 and brush holder 10 pivotally mounted on the carriage 11 and pressed by spring 12 on the rail (Fig. 6). The entire carriage supporting the brushes may be raised and lowered at will by means of hand lever 13 and link 14 and bell crank lever 15, the carriage being supported from the track when in lowered position by means of wheels 16—16'. Said wheels are preferably canted slightly outwardly (Fig. 2) so that the brushes, when on the track, will always be positioned in the same location with respect to the breadth of the rail head as indicated in Fig. 6. This is due to the fact that the canting of the wheels causes them to be constantly urged in such direction that the flanges thereof engage the rail. This toeing out of the wheels 13 and 14, by tending to keep the wheel flanges constantly in engagement with the rail, thus maintains a constant relative position laterally between the detector coils carried by the carriage and the rail. It is found that flaws usually occur nearer the inside than the outside of the rail head. Therefore, I prefer to maintain the contactor brushes somewhat nearer the inside than the outside of the rail head.

Between the current supply brushes I place two smaller carriages 17 which may be spring-supported by springs 18 on the main carriage 11. Each of the smaller carriages 17 is shown as having two small wheels 19 normally resting on the track and maintained against the track at a uniform pressure by means of springs 18. On said carriage are pivotally mounted the detector brushes or rollers 20, 20'. One form of such rollers is shown in Figs. 8 and 9. The rollers are mounted on arms 21, 22 pivoted respectively on shafts 23, 24 on the carriage and each having an upstanding arm 25 to which is attached a spring 26 for holding the roller firmly against the rail. One roller 20 is slightly in advance of the other roller 20' as shown, and the rollers may be placed at an angle to the track for a purpose hereinafter described. Rail cleaning brushes 24, 25 may also be provided to assure good contact with the rail. Said brushes may be revolved by a suitable motor 26.

In my prior patent, above referred to, actuations of the apparatus, caused by variations in supply voltage or poor contact with the rail, were prevented from making an indication on the recording chart which would be confused with the flaw indications, by utilizing a number of pairs of detector brushes and recording pens and causing the first mentioned type of variations to cause a different character of indication on the chart from the flaw indication. In my present invention, however, I prefer to prevent any actuation of my recording apparatus by any cause other than flaws. I thereby have eliminated the necessity for employing more than one pair of detector brushes on each rail. This not only makes a simpler apparatus but also gives greater accuracy, since it does not divide the current between several sets of brushes.

The preferred form of my invention is shown diagrammatically in Fig. 5 which will be first described. In this figure the heavy current generator 2, the main supply brushes 3 and 4, and the detector brushes 20 and 20' are shown diagrammatically in the lower left hand corner of the figure. The detector brushes are placed in electrical relationship with a cascade system of thermionic tubes 34, 35, 36, 37, the brushes being connected so as to charge the grid 34' of the first tube with a negative potential, the variations in the potential of the grid of this tube relative to the filament governing the other tubes of the amplifying system. The more negative the grid potential becomes with respect to the filament the higher the output of the amlifier. The intermediate emplifying tubes 35 and 36 are shown as of the improved screen grid type which have in addition to the usual grid, filament and plate a screen 38 connected as shown with a separate battery 39.

Separate C batteries 40, 41 and 42 and separate B batteries 40', 41' and 42' are also shown as provided for some or all of the tubes. If, for instance, the same B batteries were used for the last tube as for the others, any increase in flow of current therethrough would cause a drop in voltage of the B battery and, therefore, a drop in voltage supplied to the plate of the other tubes, resulting in the rapid building up of an unstable condition. With a separate B battery for the other tubes this trouble is avoided. Potentiometer adjustments are also preferably provided at 103, 104 and 105 in connection with C batteries 40 and 41 and B batteries 40' to adjust the output of the set so that the relays are not operated by any fluctuations below a predetermined value. The last tube 37 has the plate thereof connected to a plurality of pen relays 45, 45', 45'' for controlling the marking pens. In this form of the invention also, the rail joint relay 56, for controlling the rail joint marking pen, is connected with a separate set of amplifying tubes 57—58 which have a less amplifying coefficient than tubes 36 and 37. The grid 57' of tube 57 is shown as connected in parallel with the grid of tube 36 of the main group and the plate 58' of the last tube 58 is connected to the rail joint relay 56. The respective pen relays are shown as connected to the respective pen magnets 46—46'—46'', while the rail joint relay is connected to the rail joint pen marking magnet 59. Preferably the winding 59' for the other rail is mounted to actuate the same armature 47 as the winding 59 but in the opposite direction so that on the chart the rail joints will appear as a line first in one direction and then in the other as shown in Fig. 3. As shown in Fig. 3 there are three flaw magnets 46, 46' and 46'' and one joint magnet 59 for the left hand rail and three flaw magnets 48, 48' and 48'' and joint magnet 59' for the right hand rail, but only one joint pen 50. Coil 49' in Fig. 5 is the operating coil of a rail joint counter 49.

As stated above, the several relays are wound or adjusted for different degrees of sensitivity, relay 56 and its actuating circuit being relatively insensitive so that it is actuated only by rail joints or other gaps in the rail. The other relays are progressively more sensitive. For a very small flaw only one relay 45, for instance, is designed to be operated, for a larger flaw two relays 45 and 45', and for a serious flaw all three relays 45, 45' and 45''. Thus the indications on the chart show at a glance the relative size of the fissure as well as its presence. Referring to Fig. 3, the rail joints in the left hand rail are shown at $a$, $b$ and $c$, and in the right hand rail at $d$ and $e$, because the pen 50 of coils 59 and 59' is only actuated by such. A very small fissure is shown in the left hand rail at $f$ because only the supersensitive relay 45 for pen magnet 46 and pen 146 is actuated by such a small flaw. A larger flaw is indicated at $g$ in the left hand rail and a very serious flaw at $h$ in the left hand rail and at $h'$ in the right hand rail.

In addition to making a record of the flaws, other signalling or indicating means may be provided. As shown in Fig. 5 I provide a means for marking the rail distinctively at the flaw. For this purpose an extra relay 62 is provided which is controlled jointly by contact 51 of sensitive relay 45 and by back contact 56'' on contact 56' of relay 56. Relay 62 is so arranged, therefore, that its circuit cannot be closed when the rail joint magnet 56 is excited to close contact 56' and open contact 56'' but is closed for all flaws which actuate sensitive relay 45. The rail marking device proper may be in the form of a paint-daubing device operated from coil 63 controlled by relay 62, paint being placed in the container 65 (Fig. 15) which is connected to a source of compressed air by a pipe 66. The valve 67 is placed in the outlet pipe which is normally maintained closed but which is opened by means of electromagnet or solenoid 63 connected to the slide valve 67, so that when the magnet is excited the valve will be momentarily opened and a dab of paint splashed on the rail, the valve being closed again by spring 68.

Taking up now the special means employed to prevent variations in the main supply current passing through the rail from affecting the relays and also the means for preventing temporary bad, or loss of, contact of the detector brushes with the rail from also affecting the relays, it should be observed that I preferably connect across the two detector brushes 20, 20' a resistance 71, preferably on the order of one hundred thousand ohms more or less. One end of this resistance is connected to the wire from the brush 20 which leads to the grid 34' of the first tube 34 through single cell "C" battery 72. Connected adjacent the positive end of said resistance is a second resistance 73 having the other end thereof tapped in the filament circuit of tube 34 and also connected to a special "generator" of potential designed to impress a voltage on said resistance which counterbalances the fluctuations in drop across resistance 71 due to supply current changes. In this form of the invention the "generator" is in the form of one or more extra or equalizer tubes 75 and 76, the tube 76 having the plate 76' thereof placed in circuit with the B battery 74 and the said resistance 73. Tubes 75 and 76 are shown as having the filaments thereof lighted by the separate A battery 78 and are placed in a shunt circuit around that portion of the main supply wire 79 between the positive terminal of the generator 2 and the brush 4, which is marked by the points 80 and 81. The grid 75' of the first tube 75 is connected to point 80 while the filament is shown as connected to point 81. The grid 82 of the second tube is in circuit with C battery 83 and the plate of the first tube.

The theory of operation of this method of preventing actuation of the system by the conditions above mentioned is as follows: If the voltage drop in resistance 71 is made equal and opposite to the voltage drop in resistance 73 for a normal rail, then if the input to the rail fluctuates, the grid potential 34' will not vary because as the drop through resistance 71 varies with said fluctuating input, the drop through resistance 73 will vary equally and oppositely so that the voltage across 71—73 remains constant and no actuation of the relay will occur. The voltage drop through resistance 73 is made to vary with the heavy current input as follows: The output of tubes 75 and 76 passes through resistance 73 and the input to said tubes is governed by the potential drop over the distance 80—81 applied to the grid 75' of the tube 75. If the voltage drop across 80—81 increases, the voltage applied to 73 will also increase to equal and oppose the corresponding increase in voltage through resistance 71. Therefore, actuation of relays, due to such a cause, is prevented. If, on the other hand, the two detector brushes 20—20' leave the rail or have poor contact therewith, the relays are also not operated for the following reasons. As explained above, the contacts and C battery 72 are placed so as to give the grid 34' a negative potential so that the more positive the grid potential becomes with respect to the filament, the lower the output of the amplifier. Normally the potential from the rail, as represented across resistance 71, will be counter-balanced by equal and opposite potential across resistance 73. Now if brush 20 leaves the rail, then the potential across resistance 71 and 73 will be positive and will have the value of the potential across 73. This would result in a reduction of the output of the amplifier. Now, if brush 20' leaves the rail instead of having the potential across 71 equal and opposite to 73, we have current flowing through 73 and 71 in series. This gives slightly larger positive potential than in the previous case. This also results in a reduction of the amplifier output. Now, if both brushes leave the rail, there is no potential drop across either 71 or 73 and the condition then is the same as if both were equal and opposite. Therefore, no signal is given by the system under any of these conditions. If either or both brushes have poor contact with the rail instead of leaving the rail entirely, the same general theory applies and no signal is given.

I have found it very important also to shield the radio set from all sources of disturbance. For this purpose I not only shield the set as a whole and each tube from the radio waves by a good electric conductor, such as a copper shield, but also separately shield the sources of E. M. F., such as the batteries and generator by such means, indicated generally by dotted lines 90 in Fig. 5. In addition to this screen or shield, I also provide a shield against stray magnetic lines of force. This shield is preferably composed of magnetic material, such as iron, and may be made in the form of iron tubes 91 to enclose completely each of the thermionic tubes as indicated in Fig. 14. Either or both of said shields may be grounded so that they also act as a shield from capacity effects.

On account of the jarring of the cars that pass over the rails, I also find it important to take extra precautions to prevent vibration of the sensitive elements of the tubes. To this end I prefer to mount the tubes in an inverted position as shown in Fig. 14 with all parts cushion-supported as by surrounding the tubes and pipes by sponge rubber 91'.

As indicated above, much trouble was also experienced for some time with the set which was finally tracked to the generation of thermocouples by the detector brushes due to the heating up of the brush at the point where it rubbed against the rail to a temperature above that of the remote portions of the circuit. In a system of great sensitivity, as employed by applicant, this was found to give false indications and to interfere with the correct functioning of the apparatus. I have devised several means for overcoming this difficulty, one of which consists in employing rollers 20—20' in place of sliding brushes. Said rollers (Figs. 8 and 9) present continually a new surface to the rail so that they do not overheat at the point of contact, but have the disadvantage of not always making the best contact with the rail, owing to the collection of dirt on the rim. One method of preventing this is to cant the rollers at a slight angle to the rail, as indicated in Fig. 9, so that a slight wiping action will be secured sufficient to keep the surface clean and bright.

Another method of keeping the roller surface free from dirt is to rotate the roller at a slightly different speed than it would naturally rotate rolling over the rail. This may be accomplished as shown in Fig. 10 by gearing it as by belt 92 to a pulley 93 on the axle of the wheel 19'.

Another method of securing this differential rotation is shown diagrammatically in Fig. 12 and consists in gearing to the shaft of the roller 20 a constant speed mechanism 21, which will prevent the roller from rotating more than at a certain predetermined speed, the apparatus being so designed that this is slower than the car usually travels.

I have also devised a method of eliminating thermo-couple effects with sliding brushes. In Fig. 11, the detector brushes are shown at 120 and 120', which, of course, are connected to the high resistance circuit 71 of Fig. 5. Between said resistance circuit and said brushes there are connected large auxiliary brushes 86—86' which contact with the rail to either side of the brushes 120—120', the main supply brushes 3—4 not being shown in this figure. The action of this apparatus in eliminating thermo-couples is that if a couple effect is generated between the point of contact of the brush 120' and the rail and the point 87, the current therefrom will travel in a direct path back through the larger brush 86 to the rail through the path indicated by the arrows instead of traveling into the amplifying system.

Still another method of eliminating this thermo-couple with the sliding brush is indicated in Fig. 13. In this system a plate of metal 88 is supported on brush 120" adjacent the contacting end thereof. Said plate is electrically connected to the brush at its longest point 88' and is surrounded by a heavy heat insulating portion 89 so that it assumes practically the same temperature as the brush. It is, however, composed of a metal which generates a thermo-couple of opposite sign but of like value to the thermo-couple generated by the brush. By connecting the ends at 92, therefore, the two couples cancel out and no disturbance is transmitted in the amplifying system.

In the form of the invention shown in Fig. 4, I employ a system of balanced resistance for eliminating disturbances due to current variations through the rail. In this system, the three detector brushes 27, 28, 29 are placed in circuit with a pair of variable resistances 30 and 31 as shown, the tap 32 in resistance 30 being so adjusted that when the potential drop through the rail head is uniform then no current will flow through the other resistance 31, since the voltage drop between brushes 27 and 28 equals that between 28 and 29. When, however, a flaw is passed over by brushes 27 and 28, the voltage drop increases resulting in a current flow in one direction through resistance 31 and when the flaw passes brushes 28 and 29, the current flow through resistance 31 is reversed.

The feeble variation produced by a flaw in the system is amplified many times by placing the circuits above described in electrical relationship with the thermionic cascade amplifying system which may be similar to that of Fig. 5. Between each tube is shown a suitable form of resistance coupling 96, and the plate 37' of the last tube is in circuit with a plurality of relay coils 95 controlling the indicating or recording mechanism. In this system I have shown separate "C" batteries 94 for the plate of each tube with a variable resistance 95 for adjusting the charge.

In Fig. 16 is shown a somewhat different type of equalizing system than the one that is now preferred. In this system the above mentioned variations in voltage supply, etc. are prevented from affecting the system in a somewhat different manner than in Fig. 5. Instead of employing thermionic tubes as a means of generating an equalizing voltage as in Fig. 5, I may employ an auxiliary dynamo electric machine 99 (see Fig. 16). In this instance the armature 100 of such auxiliary generator is placed across resistance 73 through variable rheostat 101. The field 102 of said generator is placed in series with the main heavy current generator 2 so that if the current flowing to the rail increases, the output of the armature increases, thus increasing the voltage across 73 and keeping the voltage across 71—73 constant.

A method of eliminating the disturbing effects of variations in supply current for the rail which has the advantage of great simplicity is shown in Fig. 17. This figure illustrates only the first tube of the set which may otherwise be similar to the hook-up of the main tubes in Fig. 16 or Fig. 5. As in Fig. 5 one of the main supply wires to the brushes 3 and 4 is tapped at 80 and 81. To these points is connected a coil 110 which is placed in close proximity to the first tube 134, that is, preferably around or adjacent the top of the tube. A variable resistance 111 is preferably placed in circuit with said coil to adjust its effect on the tube or other equivalent arrangement. The effect of this coil is to vary the output of tube 134 by varying the electric field within the tube which varies the ionization. By properly connecting the coil, a drop in voltage supply may be made to cause an increase in the output of the tube or the reverse and by adjusting the resistance 111 this change in the output may be made to just balance the change in output which would otherwise be produced by the altered charge on the grid 134' due to said change in voltage supply. By this simple means variations in voltage supply do not affect the system. In this system also the disturbing effects of loss of contact with the rail by the detector brushes is obviated by means of the high resistance 71 and C battery 72. This system has the great advantage of avoiding the necessity for the extra thermionic tubes 75 and 76 and the extra resistance 73 of the form shown in Fig. 5 and also of the extra generator 99 of the form shown in Fig. 16.

Having described my invention, what I claim and desire to secure by Letters Patent is:

1. In a rail flaw detector having means for supplying current to the rail, a plurality of contacts, means for moving the rail and contacts relatively to each other, and a thermionic amplifying system having the grid of the first tube connected to receive a potential from one of said contacts and the filament to receive a potential from the other of said contacts, the combination of means for preventing variations in the current flowing through the rail from affecting said system, comprising means for varying the output of the system with variations in the voltage applied to the rail inversely as the output would otherwise be varied by the altered potential applied to the grid due to such cause.

2. In a rail flaw detector having means for supplying current to the rail, a plurality of contacts, means for moving the rail and contacts relatively to each other, and a thermionic amplifying system having the grid of the first tube connected to receive a potential from one of said contacts and the filament to receive a potential from the other of said contacts, the combination of means for preventing variations in the current flowing through the rail from affecting said system, comprising a coil adjacent said first tube and tapped into the supply line for the rail whereby the effect of the variation in the grid potential due to such cause is counterbalanced by the variation in normal output due to the altering of the electron field within the tube by said coil.

3. In a rail flaw detector having means for supplying current to the rail, a plurality of contacts, means for moving the rail and contacts relatively to each other, and a thermionic amplifying system having the grid of the first tube connected to receive a potential from one of said contacts and the filament to receive a potential from the other of said contacts, the combination of means for preventing variations in the current flowing through the rail from affecting said system, comprising a resistance connected across said contacts, a second resistance between one contact and the filament, an auxiliary thermionic set connected to spaced points in the supply line for generating a potential upon variation in the current supplied to the rail, and means for applying said last-named potential to said second resistance so that the voltage drop in said second resistance always equals and opposes the voltage drop in the first resistance regardless of supply fluctuations.

4. A flaw detector for metallic bars, rails or the like comprising a system of thermionic tubes, means for supplying a heavy current to the rail, a pair of detector brushes in electrical relationship with said tubes, means for imparting relative movement to said brushes and rail, said brushes and rail forming thermo-couples, and means interposed between said couples and said system of tubes for nullifying the effect on said system of the currents generated by said couples.

5. In a rail flaw detector having means for supplying current to the rail, a plurality of contacts, and means for moving the rail and contacts relatively to each other, the combination of a thermionic amplifying system in electrical relationship with said contacts, and means for preventing variation in the voltage supplied to the rail from affecting the indication of said system comprising means for generating a counter potential upon said variation in the voltage supply and applying said counter potential to counterbalance the effect on the system of said variation.

6. In a rail flaw detector having means for supplying current to the rail, a plurality of contacts, and means for moving the rail and contacts relatively to each other, the combination of a thermionic amplifying system in electrical relationship with said contact, and means for preventing variation in the voltage supplied to the rail from affecting the indication of said system comprising an auxiliary thermionic set connected to spaced points in the supply line for generating a counter potential upon said variation in the voltage supply and applying said counter potential to counterbalance the effect on the system of said variation.

7. In a rail flaw detector having means for supplying current to the rail, a plurality of contacts, and means for moving the rail and contacts relatively to each other, the combination of a thermionic amplifying system having the grid of the first tube connected to receive a potential from one of said contacts and the filament to receive a potential from the other of said contacts, means for causing a flaw to increase the output of the system and for causing loss of or poor contact of said contacts with the rail to decrease the output of the system, and indicating mechanism actuated from said system and arranged to be affected only by increased output.

8. In a rail flaw detector having means for supplying current to the rail, a plurality of contacts, and means for moving the rail and contacts relatively to each other, the combination of a thermionic amplifying system having the grid of the first tube connected to receive a potential from one of said contacts and the filament to receive a potential from the other of said contacts, means for giving said grid a negative bias, means for causing a flaw to increase the output of the system and for causing loss of or poor contact of said contacts with the rail to decrease the output of the system, and indicating mechanism actuated from said system and arranged to be affected only by increased output.

HARCOURT C. DRAKE.